United States Patent [19]

Storey

[11] 4,025,330
[45] May 24, 1977

[54] ZINC-CONTAINING FOLIAR SPRAY

[75] Inventor: James Benton Storey, College Station, Tex.

[73] Assignee: Allied Chemical Corporation, Morristown, N.J.

[22] Filed: Dec. 22, 1975

[21] Appl. No.: 643,205

Related U.S. Application Data

[63] Continuation of Ser. No. 553,953, Feb. 28, 1975, abandoned.

[52] U.S. Cl. .................................... 71/30; 71/53; 71/63; 71/64 C; 47/DIG. 4; 47/DIG. 13
[51] Int. Cl.$^2$ .......................................... C05C 9/00
[58] Field of Search ............ 71/1, 30, 53, 63, 64 C; 47/DIG. 4, DIG. 13

[56] References Cited

OTHER PUBLICATIONS

"Zn Nitrate Opens New Frontiers of Rosette Control" Pecan Quarterly, vol. 8, No. 1, Feb. 1974.

Primary Examiner—Frank A. Spear, Jr.
Assistant Examiner—Ferris H. Lander
Attorney, Agent, or Firm—Patrick L. Henry; Richard A. Anderson

[57] ABSTRACT

In foliar application of zinc nitrate in aqueous solution, zinc absorption by leaves is facilitated by incorporating in the solution a synergistic combination of said zinc nitrate, ammonium nitrate and urea.

12 Claims, No Drawings

ZINC-CONTAINING FOLIAR SPRAY

This is a continutation, of application Ser. No. 553,953, filed Feb. 28, 1975, and now abandoned.

BACKGROUND OF THE INVENTION

This invention relates to the foliar application of zinc compounds in aqueous solution. More particularly, the invention relates to an improved foliar spray composition comprising a synergistic combination of zinc nitrate, ammonium nitrate and urea in aqueous solution.

The use of micronutrients as fertilizers is experiencing increased use. The elements such as zinc, manganese, boron, copper, molybdenum and iron are fully as important as the primary nutrients, nitrogen, phosphorus, and potassium, although the former are used in much smaller quantities. Agronomic tests in a large number of states have been concerned with establishing where the need for micronutrients exists, comparing sources and carriers and indicating amounts that may be needed.

It is now known that plants growing on soils having pH values over 7.0 usually suffer from lack of zinc availability in the soil due to the presence of various calcium compounds. Therefore, zinc is usually supplied to the plants by foliar means. Unfortunately, foliar application of zinc compositions in accordance with prior procedures is not completely satisfactory because of relatively low absorption of the micronutrient by the leaves of the plant. The best zinc composition previously found has been zinc sulfate combined with a fertilizer solution composed of ammonium nitrate and urea (The Pecan Quarterly, Vol. 7; No. 2, May 1973).

SUMMARY OF THE INVENTION

The present invention provides a new zinc-containing foliar spray composition and method of using the same for increasing zinc absorption by leaves.

The instant foliar spray composition consists essentially of about 0.5 to 4 parts by weight, preferably 0.9 to 1.8 parts by weight, of zinc nitrate; 2 to 5 parts by weight, preferably 4 to 5 parts by weight, of an aqueous fertilizer solution comprising ammonium nitrate and urea, said fertilizer solution containing at least 20 percent by weight of urea and at least 20 percent by weight of ammonium nitrate; and up to about 1,000 parts by weight of water.

It will be understood that the urea and ammonium nitrate may be incorporated into the foliar spray composition as solids, if desired. However, it is convenient to add the ammonium nitrate and urea as a fertilizer solution because such solutions are readily available. Preferred solutions are those normally used as soil fertilizers or in the production of fertilizers, i.e., those solutions of pH 6–7 containing on a weight basis at least about 30 percent each of ammonium nitrate and urea, at least about 15 percent of water, and up to 1 percent of free ammonia. A commerical solution made by Allied Chemical Corporation is sold under the trademark URAN; a typical solution contains about 45.1 percent ammonium nitrate, 34.8 percent urea and 20.1 percent water.

DESCRIPTION OF THE PREFERRED EMBODIMENTS

The present invention is based on the discovery of a synergistic effect in the absorption of zinc ions by plant leaves, said synergism resulting from the combination of certain critical proportions of zinc nitrate, ammonium nitrate and urea in a relatively dilute foliar spray. Preferably, the foliar spray composition consists essentially of 0.9 to 1.8 parts by weight of zinc nitrate; 2 to 5 parts by weight of an aqueous fertilizer solution comprising ammonium nitrate and urea, said fertilizer solution containing at least about 30 percent by weight of urea, at least about 30 percent by weight of ammonium nitrate, at least about 15 percent of water, and up to 1 percent of free ammonia; and about 1,000 parts by weight of water.

In order to demonstrate the invention, the following examples are given.

EXAMPLE 1

Pecan trees suffering from severe zinc deficiency are characterized by rosette and die-back. More subtle symptoms, however, such as smaller than average leaves, reduced yields and pronounced alternate bearing are more commonly experienced.

Zinc is not available to pecan roots in soil high in calcium carbonate in quantities sufficient to insure normal pecan tree growth development. Even though zinc may be abundant in calcareous soils, trees may suffer from lack of zinc because it is in the form of insoluble compounds such as zinc carbonate. Therefore, zinc is usually supplied by foliar means. Best application times seem to be as buds are breaking, one week later, two weeks later, and then at about three week intervals until shoot elongation has ceased. The best foliar spray previously found has been zinc sulfate in the presence of an aqueous ammonium nitrate-urea solution. This example shows that about twice as much zinc is absorbed by leaves from an equivalent amount of zinc in the form of zinc nitrate rather than zinc sulfate of said prior procedure.

The following table shows the zinc content of pecan leaves from trees foliarly treated with various rates of zinc sulfate or zinc nitrate plus a concentrated fertilizer solution containing 32 weight percent total nitrogen composed of half ammonium nitrate and half urea. Tests were carried out in Texas in a pecan orchard in Brazos River flood plain.

TABLE I

| Treatment Pounds Material per 1,000 Pounds of Water | | | Mean* Zinc Content of Leaf, (PPM) |
|---|---|---|---|
| Zinc Sulfate | Zinc Nitrate | Urea-Ammonium Nitrate Solution | |
| 0 | 0 | 0 | 28 a |
| 2.4 | 0 | 0 | 454 d |
| 2.4 | 0 | 5 | 734 e |
| 0 | 1.8 | 0 | 275 bd |
| 0 | 1.8 | 5 | 976 fg |
| 0 | 3.6 | 0 | 976 fg |
| 0 | 3.6 | 5 | 1062 g |

*Means followed by different letters are significantly different 95 percent of the time.

Those skilled in the art will note that the foliar spray composition containing zinc nitrate, ammonium nitrate and urea gave significantly better results at the 95% confidence level than the foliar spray composition containing zinc sulfate, ammonium nitrate and urea. Also, because of the relatively high cost of zinc compounds, it will be clear to those skilled in the art that the foliar spray composition containing about 0.18% zinc nitrate plus ammonium nitrate and urea is preferred over the compositions containing 0.36% zinc nitrate, although zinc absorption was not significantly different.

From these and other tests it was determined that about 1.25 acres may be sprayed with about 500 gallons (about 4,200 pounds) of the preferred dilute foliar spray with effective results.

EXAMPLE 2

The procedure of Example 1 was repeated except that no zinc sulfate was used and the amounts of zinc nitrate used was varied to determine the most economical, effective treatments. Table II shows results.

It should be noted that Example 1 tests were conducted in 1972, whereas Example 2 tests were conducted in 1973.

TABLE II

| Treatment Pounds Material per 1,000 Pounds of Water | | Mean* Zinc Content of Leaf, (PPM) |
|---|---|---|
| Zinc Nitrate | Urea-Ammonium Nitrate Solution | |
| 0 | 0 | 23 a |
| 3.6 | 0 | 170 ef |
| 3.6 | 5 | 271 g |
| 1.8 | 0 | 68 cd |
| 1.8 | 5 | 151 e** |
| 0.9 | 0 | 37 ab |
| 0.9 | 5 | 70 d** |
| 0.45 | 0 | 38 ab |
| 0.45 | 5 | 57 bd |

*Means followed by different letters are significantly different 95 percent of the time.
**Most economical, effective treatments.

In other tests, it was determined that the maximum desirable concentration of the urea-ammonium nitrate solution in the foliar spray was about 5 pounds per acre per application. Higher concentrations may cause burning of the foliage, particularly in dry climates. Also, attempts to eliminate urea or ammonium nitrate from the formulation have led to relatively poor results.

Also, the concentration of zinc nitrate is preferably limited to less than 2 pounds per acre per application. This applies to all regions, no matter how many pounds of zinc have been used in the past. The present invention significantly increases the zinc absorption, and as more zinc goes in, the high rates of zinc application used in the past can burn leaves.

I claim:

1. A foliar spray composition consisting essentially of about 0.5 to 4 parts by weight of zinc nitate; 2 to 5 parts by weight of an aqueous fertilizer solution comprising ammonium nitrate and urea, said fertilizer solution containing at least 20 percent by weight of urea and at least 20 percent by weight of ammonium nitrate; and up to about 1,000 parts by weight of water.

2. The foliar spray composition of claim 1 wherein 0.9 to 1.8 parts by weight of zinc nitrate are present in said composition.

3. The foliar spray composition of claim 1 wherein 4 to 5 parts by weight of said aqueous fertilizer solution are present in said composition.

4. A foliar spray composition consisting essentially of 0.9 to 1.8 parts by weight of zinc nitrate; 4 to 5 parts by weight of an aqueous fertilizer solution comprising ammonium nitrate and urea, said fertilizer solution containing at least 20 percent by weight of urea and at least 20 percent by weight of ammonium nitrate; and up to about 1,000 parts by weight of water.

5. The foliar spray composition of claim 4 wherein the aqueous fertilizer solution has a pH of 6–7, and contains at least 30 percent by weight of urea and at least 30 percent by weight of ammonium nitrate.

6. The foliar spray composition of claim 5 wherein the aqueous fertilizer solution contains at least 15 percent by weight of water and up to 1 percent by weight of free ammonia.

7. A foliar spray composition consisting essentially of 0.9 to 1.8 parts by weight of zinc nitrate; 4 to 5 parts by weight of an aqueous fertilizer solution comprising ammonium nitrate and urea, said fertilizer solution having a pH of 6–7 and containing on a weight basis at least about 30 percent each of ammonium nitrate and urea, at least about 15 percent of water, and up to 1 percent of free ammonia; and about 1,000 parts by weight of water.

8. In foliar application of zinc to plants suffering from zinc deficiency, a method to increase the absorption of zinc by plant leaves which comprises spraying said leaves with a foliar spray consisting essentially of 0.9 to 1.8 parts by weight of zinc nitrate; 2 to 5 parts by weight of an aqueous fertilizer solution comprising ammonium nitrate and urea, said fertilizer solution having a pH of 6–7 and containing on a weight basis at least about 30 percent each of ammonium nitrate and urea, at least about 15 percent of water, and up to 1 percent of free ammonia; and up to about 1,000 parts by weight of water.

9. The method of claim 8 wherein the plant leaves are pecan leaves.

10. The method of claim 8 wherein the foliar spray composition is sprayed at the rate of about 400 gallons per acre.

11. In foliar application of zinc to plants suffering from zinc deficiency, a method to increase the absorption of zinc by plant leaves which comprises spraying said leaves with a foliar spray consisting essentially of about 0.5 to 4 parts by weight of zinc nitrate; 2 to 5 parts by weight of an aqueous fertilizer solution comprising ammonium nitrate and urea, said fertilizer solution containing at least 20 percent by weight of urea and at least 20 percent by weight of ammonium nitrate; and up to about 1,000 parts by weight of water.

12. In foliar application of zinc to plants suffering from zinc deficiency, a method to increase the absorption of zinc by plant leaves which comprises spraying said leaves with a foliar spray consisting essentially of 0.9 to 1.8 parts by weight of zinc nitrate; 4 to 5 parts by weight of an aqueous fertilizer solution comprising ammonium nitrate and urea, said fertilizer solution containing at least 20 percent by weight of urea and at least 20 percent by weight of ammonium nitrate; and about 1,000 parts by weight of water.

* * * * *

UNITED STATES PATENT AND TRADEMARK OFFICE
CERTIFICATE OF CORRECTION

PATENT NO. : 4,025,330
DATED : May 24, 1977
INVENTOR(S) : James Benton Storey

It is certified that error appears in the above-identified patent and that said Letters Patent are hereby corrected as shown below:

Column 3, Claim 1, line 45, "nitate" should be -- nitrate --.

Signed and Sealed this

Eleventh Day of October 1977

[SEAL]

Attest:

RUTH C. MASON
Attesting Officer

LUTRELLE F. PARKER
Acting Commissioner of Patents and Trademarks